United States Patent
Gowan et al.

(10) Patent No.: US 7,346,244 B2
(45) Date of Patent: Mar. 18, 2008

(54) COATED CENTRAL STRENGTH MEMBER FOR FIBER OPTIC CABLES WITH REDUCED SHRINKAGE

(75) Inventors: Russell W. Gowan, Hickory, NC (US); Brian Risch, Hickory, NC (US); Wayne Cheatle, Hickory, NC (US)

(73) Assignee: Draka Comteq B.V., Amsterdam (NL)

( * ) Notice: Subject to any disclaimer, the term of this patent is extended or adjusted under 35 U.S.C. 154(b) by 1302 days.

(21) Appl. No.: 09/814,943

(22) Filed: Mar. 23, 2001

(65) Prior Publication Data

US 2008/0013899 A1    Jan. 17, 2008

(51) Int. Cl.
*G02B 6/44*    (2006.01)

(52) U.S. Cl. .................. 385/113; 385/100; 385/105; 385/109

(58) Field of Classification Search ............... 385/100, 385/103, 113, 106; 428/394, 395, 397, 398
See application file for complete search history.

(56) References Cited

U.S. PATENT DOCUMENTS

| | | | | |
|---|---|---|---|---|
| 4,143,942 A * | 3/1979 | Anderson | ............... | 385/113 |
| 4,457,583 A * | 7/1984 | Mayr et al. | ............... | 385/113 |
| 5,062,685 A * | 11/1991 | Cain et al. | ............... | 385/114 |
| 5,146,529 A | 9/1992 | Mizutani | ............... | 385/103 |
| 5,210,377 A * | 5/1993 | Kennedy et al. | ............ | 174/107 |
| 5,229,851 A * | 7/1993 | Rahman | ............... | 385/114 |
| 5,389,442 A | 2/1995 | Arroyo et al. | ............... | 428/396 |
| 5,390,273 A * | 2/1995 | Rahman et al. | ............ | 385/112 |
| 5,477,011 A * | 12/1995 | Singles et al. | .......... | 174/102 R |
| 5,636,308 A | 6/1997 | Personne et al. | ........... | 385/102 |
| 5,706,382 A | 1/1998 | Smith | ......................... | 385/102 |
| 5,911,023 A | 6/1999 | Risch et al. | ................ | 385/100 |
| 5,920,671 A | 7/1999 | Smith | ......................... | 385/102 |
| 5,920,672 A * | 7/1999 | White | ....................... | 385/110 |
| 6,066,397 A | 5/2000 | Risch et al. | ................ | 428/379 |
| 6,108,473 A * | 8/2000 | Beland et al. | .............. | 385/113 |
| 6,115,522 A | 9/2000 | Tachikura et al. | ......... | 385/102 |
| 6,178,277 B1 * | 1/2001 | Ravela et al. | .............. | 385/109 |
| 6,195,486 B1 * | 2/2001 | Field et al. | ................. | 385/100 |

(Continued)

FOREIGN PATENT DOCUMENTS

EP    0 702 255 A    3/1996

(Continued)

OTHER PUBLICATIONS

EP Search Report completed Nov. 21, 2003 for App. No. EP 02 29 0435.

(Continued)

*Primary Examiner*—Tina M. Wong
(74) *Attorney, Agent, or Firm*—Sughrue Mion, PLLC

(57) ABSTRACT

A foam polymer jacketed rigid strength member for a fiber optic cable is disclosed, as is the method for its production. The foam jacket is made by feeding into an extruder a base polymer material, preferably a resin, such as polypropyene. The base material is melted in the extruder and a blowing agent is admixed. As the mixture exits the extruder, the polymer is expanded into a cellular foam. The polymer is foamed onto a rigid strength member by means of a crosshead. The resulting jacketed rigid strength member demonstrates improved resistance to thermal contractions reducing the contribution of stresses in the fiber optic cable components.

5 Claims, 3 Drawing Sheets

U.S. PATENT DOCUMENTS

| | | | |
|---|---|---|---|
| 6,210,802 B1 * | 4/2001 | Risch et al. | 428/398 |
| 6,374,023 B1 * | 4/2002 | Parris | 385/109 |
| 6,463,199 B1 * | 10/2002 | Quinn et al. | 385/109 |
| 2003/0161596 A1 * | 8/2003 | Register et al. | 385/106 |

FOREIGN PATENT DOCUMENTS

| | | |
|---|---|---|
| EP | 0 890 860 A | 1/1999 |
| EP | 0 947 868 A | 10/1999 |

OTHER PUBLICATIONS

Patent Abstracts of Japan vol. 016, No. 511 (P-1441), Oct. 21, 1992 & JP 04 186206 A (Mitsubishi Cable Ind Ltd), Jul. 3, 1992.

Patent Abstracts of Japan vol. 1997, No. 11, Nov. 28, 1997 & JP 09 197206 A (Fujikura Ltd), Jul. 3, 1997.

Patent Abstracts of Japan vol. 2000, No. 04, Aug. 31, 2000 & JP 2000 009977 A (Sumitomo Electric Ind Ltd), Jan. 14, 2000.

* cited by examiner

COATED CENTRAL STRENGTH MEMBER FOR FIBER OPTIC CABLES WITH REDUCED SHRINKAGE

BACKGROUND

The present invention relates generally to the field of fiber optic cables. In particular, the present invention is directed to a novel foam-jacketed central strength member (also referred to as a cellular upjacketed rigid strength member) for fiber optic cables which demonstrates superior resistance to strain caused by thermal contraction or expansion.

Optical fibers are very small diameter glass strands which are capable of transmitting an optical signal over great distances, at very high speeds, and with relatively low signal loss as compared to standard wire or cable networks. The use of optical fibers in today's technology has developed into many widespread areas, such as: medicine, aviation, communications, etc. Because of this development, there is a growing need to have fiber optic cables operating with high efficiency with as little signal loss as possible.

At the center of common fiber optic cable is a central strength member. The central strength member has conventionally been made from a number of different materials, such as hard plastic, steel, glass, or a glass reinforced composite. The central strength member is used to bear cable installation loads so that fibers do not see strain during cable installation. The central strength member is the primary anti-buckling element in the cable; the central strength member resists cable contraction at low temperatures and prevents optical fiber buckling which would otherwise occur due to coefficient of expansion differential between optical fibers and other plastic cable components. In addition, the central strength member maintains buffer tube geometry; acts as a response member to compressive forces and provides a primary clamping point for hardware used to connect the cable to splice and routing enclosures.

Optical fibers can transmit more data more rapidly than copper wires; however, the use of optical fibers is not without its problems. One of the most important concerns when working with optical fibers is their sensitivity to damage during manufacture and installation and their sensitivity to bending and buckling. Great measures and developments have been made in attempts to protect fibers from damage during manufacture, installation, and use. Optical fiber performance is very sensitive to bending, buckling, or crushing stresses. Excessive stresses during manufacture, cable installation, or service can adversely affect the mechanical and optical performance of optical fibers.

When fibers are exposed to bending, buckling, or crushing stresses increased attenuation of the transmitted signals can result. If this increase in attenuation is high enough, the optical network in which the fiber is used can fail. Often, cables with fiber damage or cables without appropriate resistance to thermal contraction cannot be detected until a network goes into service. If a network fails due to damaged fiber or cables without an appropriate resistance to thermal contraction, high costs result from loss of service for customers and eventual replacement of defective cables.

Therefore, there is a need for providing fiber optic cable with sufficient structural properties to avoid damage and to better resist thermal contraction. The cable must have adequate tensile strength, resistance to crushing, resistance to buckling, and resistance to thermal contraction. These structural properties are frequently provided by rigid strength members.

At low temperatures, the polymeric materials that comprise most of the cable contract substantially more than the glass optical fibers. This differential strain may cause fiber strain or buckling. Such strain and buckling induced in an optical fiber will result in attenuation and possible network system failure. To mitigate this potential problem with differential cable and fiber strain, rigid elements are added to a cable as anti-buckling and anti-contractile elements. Examples of these rigid strength elements are metallic elements, glass reinforced composite rods, aramid reinforced composite rods, or composite rods made of some other high modulus, low coefficient of expansion material such as carbon fiber. Rigid strength members may be jacketed with solid polyethylene to obtain the proper outer diameter of the strength member required for the number and size of buffer tubes to be included in the cable. However, If the rigid strength members are coated, or upjacketed, with a large amount of solid polyethylene, resistance to contraction will be compromised because polyethylene has a coefficient of expansion orders of magnitude higher than that of the central strength member, which is made of glass reinforced composite, aramid reinforced composite, or metallic elements. The total contribution to low temperature contraction is equal to the coefficient of thermal expansion of the material multiplied by the temperature differential, modulus, and cross-sectional area of the material. To minimize total contractive force, a material with a low coefficient of thermal expansion is desired.

SUMMARY

The present invention seeks to improve low temperature performance of fiber-optic cables through the use of a polymeric upjacket for rigid strength members with a reduced coefficient of thermal expansion. In the present invention, rigid strength members are jacketed with a cellular polymeric material, preferentially a homopolymer or copolymer of polypropylene, to avoid low temperature differential contraction. The use of a cellular, rather than a solid, material reduces the overall material cross-sectional area, thereby reducing the total contractive force. Several side benefits include reduced cable weight, reduced material consumption and easier field preparation. Another advantage of using a cellular material is that the effective transverse rigidity of the central member is closer to that of the buffer tubes. This reduction in transverse rigidity makes the central member less likely to indent the buffer tubes during cable crush, as would be the case for a more rigid central structure.

Thus, the present invention provides a fiber optic cable comprising at least one buffer tube at least one optical fiber situated in the buffer tube, and a rigid strength member surrounded by a jacket, wherein the jacket is made of foamed polymer.

Also, the present invention provides an upjacketed strength member for fiber optic cable comprising a cylindrical rigid core surrounded by a shell of foamed polymer material.

In addition, the present invention provides a process for making a fiber optic cable comprising the steps of drawing a rigid strength member across a crosshead, extruding a polymer material through the crosshead, foaming the polymer material as it passes through the crosshead, and forming a foam jacket around the rigid strength member.

There is provided a cellular foam jacketed central strength member for fiber optic cables. The cellular upjacket is produced by expanding a polymer melt as it exits an extruder. A nucleating agent may be used to control the cell size and distribution as well as the crystalline structure of the polymeric material. A foaming agent may be used to facilitate cellular formation.

One process for production of the cellular jacketed rigid strength member of the present invention involves an extruder preferably equipped with a single screw and supercritical fluid injectors or may be used with a screw only in the case of pre-compounded materials. A supercritical fluid system allows for metering and injection of supercritical fluid, preferably carbon dioxide or nitrogen, into the melt. A crosshead with proper tooling allows the extruded foam to form a continuous cylinder around the rigid strength member. Conventional processing equipment may be used including payoff, takeup, capstans, and an extruder.

DETAILED DESCRIPTION

Figure 1:
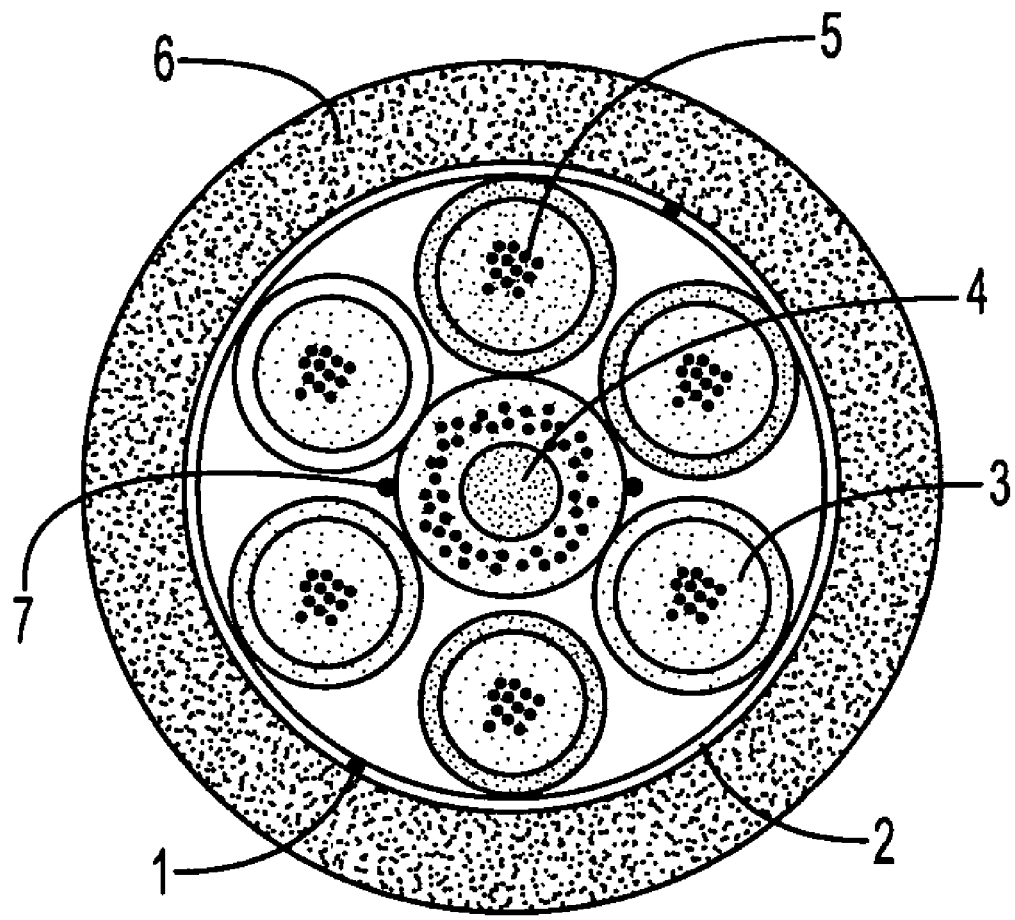
FIG. 1 is a cross-sectional view of a fiber optic cable containing the foam jacketed rigid strength member of the present invention.

FIG. 1 illustrates a fiber optic cable containing the cellular jacketed rigid strength member of the present invention. FIG. 1 shows a cross-sectional view of a fiber optic cable containing the cellular jacketed rigid strength member of the present invention. The fiber optic cable contains one or more filled buffer tubes 3 located within the fiber optic cable. The buffer tubes 3 contain optical fibers 5 within. The buffer tubes 3 are enclosed by strength yarn/water blocking binders 2. Surrounding the strength yarn/water blocking binders 2 is an outer jacket 6. A rip cord 1 is located on the inside of the outer jacket which facilitates removal of the outer jacket for access of the contents of the fiber optic cable. Water blocking yarns 7 may be included to limit water penetration.

Although FIG. 1 shows six buffer tubes 3, the quantity can increase or decrease depending on the particular application for which the cable is to be used. Within each buffer tube 3 is a plurality of individual optical fibers 5. The optical fibers 5 can be configured in any number of ways. For example, within each buffer tube 3 there can be a stacked ribbon configuration where each ribbon has a plurality of individual fibers and there are a number of ribbons. Alternatively, the fibers can be configured as bundles inside the buffer tube. The configuration will greatly depend on the use and application of the cable. Finally, the outer jacket 6 provides protection to the internal components of the cable, while keeping all of the components together. The outer jacket provides protection from the adverse physical elements that a cable can be exposed to during its use and installation.

At the center of the fiber optic cable, is a cellular jacketed rigid strength member 4. The jacketed rigid strength member 4 is surrounded by buffer tubes 3. The cellular jacketing of the rigid strength member is made of a cellular foam polymer, or similar material. One such example of the foam material is cellular impact modified, nucleated polypropylene (i.e., nucleated ethylene-propylene copolymer).

The rigid strength member 4 may be made according to the following process. A polymer, preferably a homopolymer, copolymer, or terpolymer of polypropylene, or a blend of polymers containing polypropylene, is fed into an extruder, which mixes and melts the polymer. A chemical or physical blowing agent may be added to promote foaming. Physical or chemical blowing agents can be used. While chemical blowing agents may be advantageous, physical blowing agents, such as supercritical fluid blowing agents may provide the benefit of uniform microcellular foam structure. Examples of supercritical fluids that may be used are supercritical carbon dioxide, supercritical nitrogen, or any other suitable supercritical fluid.

The materials to be foamed are mixed and then flow into the crosshead, which diverts the flow and distributes the molten material around the rigid strength member. When the extruder melt is exposed to lower pressure, dissolved gases produced by the physical or chemical blowing agents come out of solution as gas bubbles, nucleate, and grow. The process of bubble nucleation and growth results in a cellular, or foam, material. The extruder is preferably a 24:1 to 30:1 L/D ratio with preferably a 2½" to 3" screw diameter. Processing temperatures may follow an extruder profile similar to the following:

| Zone 1 | Zone 2 | Zone 3 | Zone 4 | Zone 5 | Head | Die |
|--------|--------|--------|--------|--------|------|-----|
| 350° F. | 380° F. | 400° F. | 420° F. | 420° F. | 420° F. | 400° F. |

However, as the blowing agent and polymer materials may be varied, as well as the extruder itself, one of ordinary skill would recognize that the extruder temperature profiles may vary considerably from the preferred embodiment. The present preferred embodiment may have different extruder temperature profiles depending on various flow rates and pressures.

The payoff, takeup, and capstans manage the rigid strength member, ensuring that the rigid strength member is pulled through the crosshead at a constant velocity and tension. The cellular jacket is then cooled, for instance in a water trough. The result is a cellular upjacket surrounding the rigid strength member. The foam jacket of the rigid strength member 4 is preferably approximately 0.1 to 1.0 inches in diameter.

Figure 2:
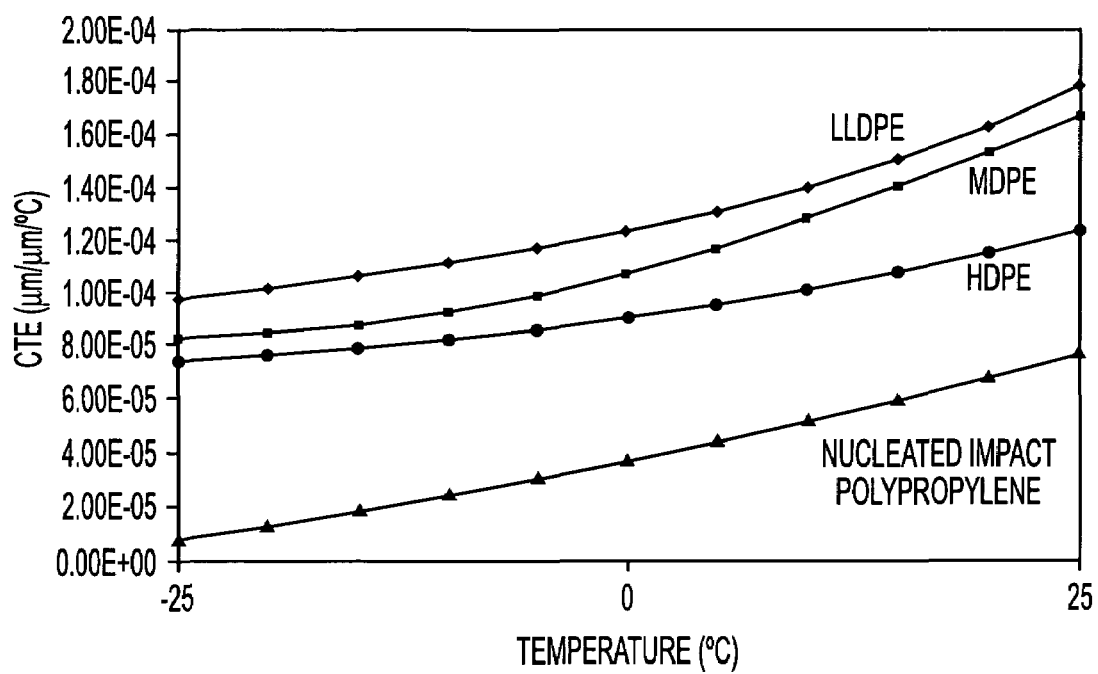
FIG. 2 is a chart displaying the coefficient of thermal expansion of various jacketing materials as a function of temperature.

The polymer used to make the upjacket may also be polyethylene. High density polyethylene ("HDPE") is preferred to medium density polyethylene ("MDPE") or linear low density polyethylene ("LLDPE"), as FIG. 2 illustrates. Nucleated impact polypropylene is most preferred because it demonstrates a lower coefficient of thermal expansion ("CTE"). As a result of having a lower CTE, the material will expand and contract less than LLDPE, MDPE, or HDPE. Various coefficients of thermal expansion (1/° C. at 23° C.) are as follows:

| | |
|---|---|
| Glass Reinforced Epoxy RSM | $5.9 \times 10^{-6}$ |
| Steel | $1.2 \times 10^{-5}$ |
| Glass | $5.5 \times 10^{-7}$ |
| Nucleated Impact Polypropylene | $6 \times 10^{-5}$ |
| Polyethylene | $1.1\text{-}1.8 \times 10^{-4}$ |

This data shows glass to have a CTE of $5.5 \times 10^{-7}$ and Glass Reinforced Epoxy rigid strength member to have a CTE of $5.9 \times 10^{-6}$. The greater the difference between the CTE of the material comprising the upjacket and the CTE of the rigid strength member core, the greater potential for thermal strain. Since polyethylene has a CTE an order of magnitude greater than that of glass or the glass reinforced epoxy rigid strength member, polyethylene would not be as effective as polypropylene. Therefore polypropylene is the most preferred polymer for fabricating the foamed upjacket of the present invention, although other polymers, such as polyethylene, polyurethane, polystyrene, and virtually any foamable polymer or polymer blend may be used to make a foam jacket for a rigid strength member, as one of ordinary skill would appreciate.

EXAMPLES

The present invention will now be explained in more detail with reference to the following examples, but the present invention is not limited to these examples.

Example 1

In Example 1, nucleated, impact modified polypropylene was foamed to foam a jacket around a 3.0 mm glass reinforced epoxy rigid strength member comprised of about 80% glass to a final outer diameter of 8.3 mm according to the process of the present invention. The foam jacket contains about 40% void space. The resulting cellular nucleated, impact polypropylene demonstrated a coefficient of thermal expansion 90% lower than that of polyethylene at −25° C. and 60% lower than that of polyethylene at 0° C. (see Example 2 below).

Figure 3:
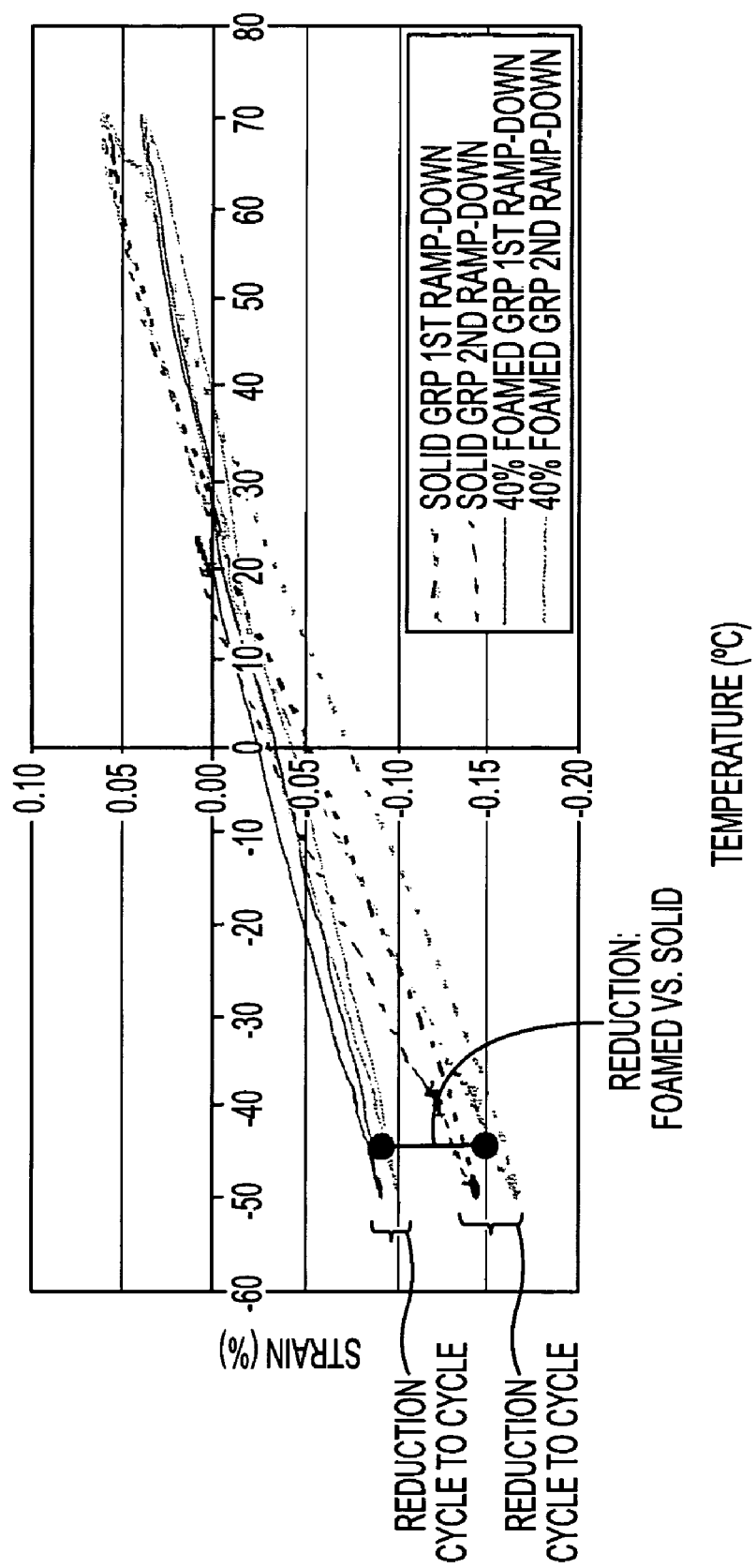
FIG. 3 is a chart illustrating two strain tests of upjacketed rigid strength members with different jackets. The y-axis is percent strain, and the x-axis is temperature. Each test was conducted over two temperature cycles.

Several tests were performed to determine the viability of foamed material as a jacket for the rigid strength member. In one test, the coefficient of thermal expansion was determined for various temperatures in the operating range of the fiber optic cable. The percent strain was analyzed as a function of time and temperature. This data was compared to similar data from Comparative Example 1 below. The results are shown in FIG. 3, as discussed in greater detail below. From these results, it is apparent that the foamed polypropylene upjacket of the present invention displayed significantly less thermal expansion and contraction than a solid polypropylene jacket.

Comparative Example 1

In Comparative Example 1, a jacketed rigid strength member was produced with a jacket of solid polypropylene. A 3.0 mm glass reinforced epoxy rigid strength member containing about 80% glass was upjacketed to a final outer diameter of 8.3 mm, yielding an upjacketed strength member of the diameter of Example 1. The results are displayed in FIG. 3.

In FIG. 3, the solid lines represent test data produced from the 40% foam jacketed rigid strength members, and the dotted lines represent the solid jacketed rigid strength members. As FIG. 3 illustrates, the solid polymer jacket resulted in a higher percentage of strain. The slope of the combined solid lines (foamed material) is lower than the slope of the dotted lines (solid material) demonstrating reduced contraction-expansion over the temperature/time range. In addition, the difference in strain from the first cycle (−50° C. to +70° C.) to the second cycle for the foamed material was reduced 40% compared to the solid material. This decrease in low temperature contraction, high temperature expansion and increase in cycle to cycle repeatability results in reduced overall cable strain due to thermal contraction, thereby reducing the risk of fiber strain and corresponding attenuation.

Example 2

In Example 2, polyethylene was foamed according to the same procedure in Example 1. The coefficient of thermal expansion was determined for both the polyethylene of Example 2 and the foam polypropylene of Example 1. As shown in FIG. 2, the foamed polypropylene displayed the lowest coefficient of thermal expansion.

While the invention has been described in detail and with reference to specific embodiments thereof, it will be apparent to one skilled in the art that various changes and modifications can be made therein without departing from the spirit and scope thereof.

What is claimed is:

1. A fiber optic cable comprising at least one buffer tube, at least one optical fiber situated in the buffer tube, and a rigid strength member surrounded by a jacket, wherein the jacket is made of foamed polymer;
    wherein said at least one buffer, tube is disposed exterior to said jacket; and
    where the foamed polymer is a member selected from the group consisting of homopolymers, copolymers, terpolymers, or polymer blends, of polypropylene.

2. The fiber optic cable of claim 1, where the foamed polymer is a nucleated, ethylene-propylene copolymer.

3. The fiber optic cable of claim 1, where the jacketed strength member used in a fiber optic cable has a foamed ethylene copolymer jacket.

4. An upjacketed rigid strength member for fiber optic cable comprising a cylindrical rigid core surrounded by a shell of foamed polymer material, wherein said upjacketed rigid strength member has a cross-sectional diameter that is less than a cross-sectional diameter of an inner surface of said fiber optic cable; and
    where the foamed polymer is a member selected from the group consisting of homopolymers, copolymers, terpolymers, or polymer blends, of polypropylene.

5. The upjacketed rigid strength member of claim 4 where the polymer material is an ethylene-propylene co-polymer.

* * * * *